US012570504B2

(12) United States Patent
Seither

(10) Patent No.: US 12,570,504 B2
(45) Date of Patent: Mar. 10, 2026

(54) TROLLEY MID-BRAKE

(71) Applicant: Unistrut International Corporation, Harvey, IL (US)

(72) Inventor: Alexander J. Seither, Harvey, IL (US)

(73) Assignee: Unistrut International Corporation, Harvey, IL (US)

( * ) Notice: Subject to any disclaimer, the term of this patent is extended or adjusted under 35 U.S.C. 154(b) by 581 days.

(21) Appl. No.: 18/130,498

(22) Filed: Apr. 4, 2023

(65) Prior Publication Data

US 2024/0336288 A1 Oct. 10, 2024

(51) Int. Cl.

*B66C 9/18* (2006.01)
*B61B 3/00* (2006.01)
*B61H 7/04* (2006.01)
*B61H 7/08* (2006.01)
*B61H 13/00* (2006.01)
*B61H 13/02* (2006.01)

(52) U.S. Cl.

CPC .................. *B66C 9/18* (2013.01); *B61B 3/00* (2013.01); *B61H 7/04* (2013.01); *B61H 7/08* (2013.01); *B61H 13/005* (2013.01); *B61H 13/02* (2013.01)

(58) Field of Classification Search

CPC .......... B61H 7/083; B61H 7/08; B61H 7/086; B61H 13/02; B61H 7/00; B61H 7/12; B60L 7/28; B61B 3/00; B66C 9/18; F16D 63/008; E01B 25/22
USPC ..................... 188/165; 105/155; 104/94, 108
See application file for complete search history.

(56) References Cited

U.S. PATENT DOCUMENTS 2,068,338 A * 1/1937 Hewitt .................. B60T 8/3235 303/3
2,106,489 A * 1/1938 Mccune .................. B61H 7/08 188/165
2,834,435 A * 5/1958 Vanderbeck ............. B66C 9/18 188/42
2,893,518 A * 7/1959 Vanderbeck ............. B66C 9/18 188/42
3,310,003 A * 3/1967 Bryan .................... B65G 9/006 104/94

(Continued)

FOREIGN PATENT DOCUMENTS

DE 3801441 A1 9/1988
DE 19518893 A1 8/1996

(Continued)

*Primary Examiner* — Zachary L Kuhfuss
(74) *Attorney, Agent, or Firm* — KDW FIRM PLLC

(57) ABSTRACT

Disclosed is trolley brake and an assembly including a trolley brake. In some embodiments, the assembly may include a channel member, and a trolley body having a first portion positioned within an interior of the channel member and a second portion extending from the channel member. The assembly may further include a locking device coupled to the trolley body, the locking device including a main body coupled to the second portion of the trolley body, a bar extending through the main body, wherein the bar is rotatable about a central axis, and a stopper coupled to a first end of the bar, wherein the stopper comprises a magnetic material. In a first position of the bar and the stopper, the stopper is in direct physical contact with the channel member, and in a second position of the bar and the stopper, a gap is present between the stopper and the channel member.

20 Claims, 10 Drawing Sheets

(56) References Cited

U.S. PATENT DOCUMENTS

| | | | | |
|---|---|---|---|---|
| 5,685,227 | A * | 11/1997 | Gaccetta | B66C 9/18 188/42 |
| 7,966,941 | B1 | 6/2011 | Brannan | |
| 11,464,696 | B2 | 10/2022 | Glukhovsky | |
| 2006/0060434 | A1* | 3/2006 | Bieker | B61H 7/086 188/164 |
| 2016/0052400 | A1* | 2/2016 | McGowan | B61B 3/00 188/165 |

FOREIGN PATENT DOCUMENTS

| | | | | |
|---|---|---|---|---|
| GB | 435508 | A | 9/1935 | |
| GB | 439915 | A | 12/1935 | |
| GB | 2274094 | A * | 7/1994 | B60P 1/5442 |

* cited by examiner

TROLLEY MID-BRAKE

BACKGROUND OF THE DISCLOSURE

Field of the Disclosure

The present disclosure relates to overhead lifting and transport systems and, more particularly, to a trolley mid-brake for overhead lifting and transport systems.

Discussion of Related Art

Mechanical devices including trolleys have long been used in places such as factories and other industrial premises for moving material and objects from one place to another. To slow and/or stop movement of the trolley, a braking system is necessary. Prior art approaches employ rubberized friction stops, which suffer from wear and increased maintenance.

It is with respect to this and other drawbacks of the prior art that the present disclosure is provided.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one approach, an assembly may include a channel member, and a trolley body having a first portion positioned within an interior of the channel member and a second portion extending from the channel member. The assembly may further include a locking device coupled to the trolley body, the locking device including a main body coupled to the second portion of the trolley body, a bar extending through the main body, wherein the bar is rotatable about a central axis, and a stopper coupled to a first end of the bar, wherein the stopper comprises a magnetic material. In a first position of the bar and the stopper, the stopper is in direct physical contact with the channel member, and in a second position of the bar and the stopper, a gap is present between the stopper and the channel member.

In another approach, an assembly may include a trolley body having a first portion positioned within an interior of a strut and a second portion extending through an opening of the strut, and a locking device coupled to the trolley body, wherein the locking device includes a main body coupled to the second portion of the trolley body, and a bar extending through the main body, wherein the bar is rotatable about a central axis. The locking device may further include a stopper coupled to a first end of the bar, wherein the stopper comprises a magnetic material, wherein in a first position of the bar and the stopper, the stopper is in direct physical contact with the strut, and wherein in a second position of the bar and the stopper, a gap is present between the stopper and the strut.

In yet another approach, a method may include connecting a trolley body to a strut, the trolley body having a first portion positioned within an interior of the strut and a second portion extending through an opening of the strut, and coupling a locking device to the trolley body. The locking device may include a main body coupled to the second portion of the trolley body, and a bar extending through the main body, wherein the bar is rotatable about a central axis. The locking device may further include a stopper coupled to a first end of the bar, wherein the stopper comprises a magnetic material. The method may further include moving the bar and stopper relative to the strut, wherein in a first position of the bar and the stopper, the stopper is in direct physical contact with the channel member to restrict movement of the trolley body relative to the strut, and wherein in a second position of the bar and the stopper, a gap is present between the stopper and the channel member to permit movement of the trolley body relative to the strut.

BRIEF DESCRIPTION OF THE DRAWINGS

The accompanying drawings illustrate exemplary approaches of the disclosed embodiments so far devised for the practical application of the principles thereof, and in which.

Figure 1A:
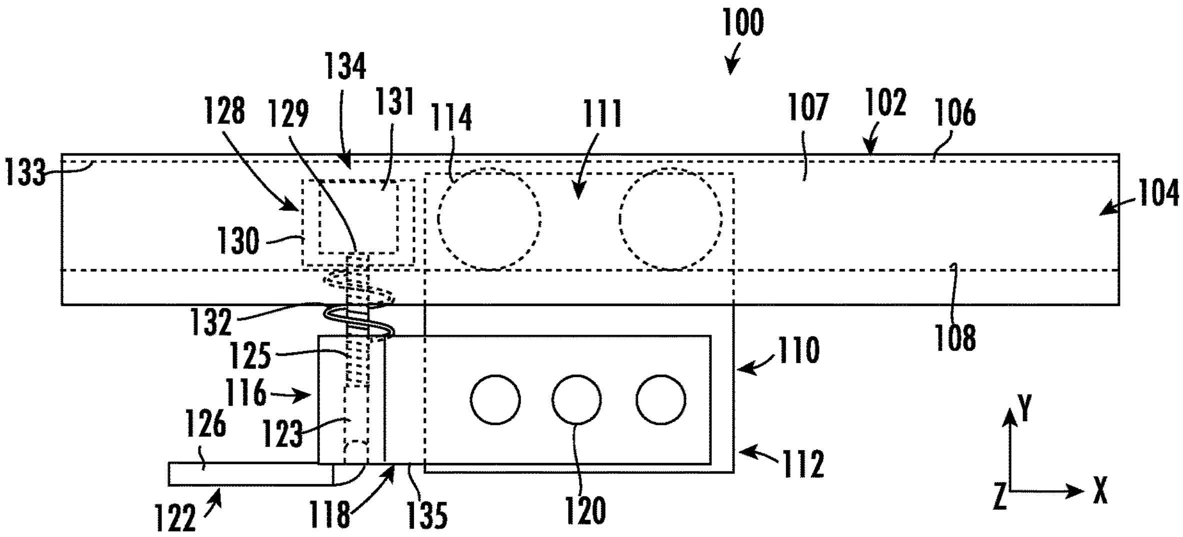
FIG. 1A is a side view of an assembly according to embodiments of the present disclosure.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DESCRIPTION OF EMBODIMENTS

The present disclosure will now proceed with reference to the accompanying drawings, in which various approaches are shown. It will be appreciated, however, that the re-usable snap-in fitting may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

To address the deficiencies of the prior art, embodiments herein describe a trolley braking system including a magnet that can be moved to an upper or a lower position. For example, when the magnet in moved to the "upper" position, it connects with the inside of the strut, keebarg it from moving. When the magnet is in the "lower" position, it is not connected to the strut and the trolley is able to move freely inside the channel. The entire assembly can be connected and disconnected from the trolley with fasteners, (e.g., bolts/nuts).

In one non-limiting example, the braking system may include a magnet with a threaded hole for attachment to an L-shaped bolt, a spring, and a connector piece. To attach to the trolley, the brake slides onto the trolley from the side and is connected using two or more outer holes, of which one is to be reserved to connect other items to the trolley. During use, when the brake is in the "down" position, the arm of the L-bolt may be parallel to the direction of travel. In this position the trolley is free to travel along the track. When the L-bolt is turned 90°, it will move up into its "upper" position in which the magnet will connect with the underside of the channel, preventing the trolley from moving. When an operator would like for the trolley to move again, the operator may pull down on the L-bolt and turn it 90°, returning it to its original position.

Improvements over existing systems are achieved because using a magnet to make the braking connection gives a strong hold without the downside of wear that comes with friction-based brakes. Furthermore, by being separate from the trolley, the braking connection can be added and removed at-will if the system is re-purposed, and can also be easily installed on systems that are already in use.

Referring now to FIGS. 1A-2B, an exemplary assembly 100 according to embodiments of the present disclosure will be described in greater detail. Although non-limiting, the assembly 100 may be useful for lifting and/or transporting an object (not shown), such as a tool or machine operating in an industrial setting. As shown, the assembly 100 may include a channel member or strut 102, which may be secured to or suspended from a ceiling or wall. The strut 102 may be a generally U-shaped strut or brace member including an interior channel 104, an end wall 106, a set of sidewalls 107, and a set of turned-in ends 108 extending from the sidewalls 107. However, it'll be appreciated that a variety of strut shapes and configurations are possible in different embodiments.

The assembly 100 may further include a trolley body 110 coupled to the strut 102. As shown, the trolley body 110 may include a first portion 111 positioned within the interior channel 104 of the strut 102, and a second portion 112 extending from the strut 102. A plurality of rollers (e.g., wheels) 114 may be coupled to the trolley body 110, wherein the rollers 114 are positioned atop the set of turned-in ends 108 of the strut 102. The rollers 114 permit movement of the trolley body 110 relative to the strut 102.

The assembly 100 may further include a locking device 116 coupled to the trolley body 110. In some embodiments, the locking device 116 may include a main body 118 coupled to the second portion 112 of the trolley body 110 using, e.g., one or more bolts/nuts (not shown) extending through openings 120 of the main body 118.

The locking device 116 may further include a bar 122 extending through the main body 118. As shown, the bar 122 may be positioned within a bar channel or opening 123, which extends vertically through the main body 118. In some embodiments, the bar 122 may be an L-shaped bolt having a first section or element 125 oriented along a central axis (e.g., axis extending through a center of the first element 125, in the y-direction), and a second section or element 126 oriented substantially perpendicular to the first element 125. It will be appreciated that the angle between the first element 125 and the second element 126 may vary in alternative embodiments. In the embodiment shown, an exterior of the first element 125 and an interior of the opening 123 may have complementary threading. As such, rotation of the bar 122 may cause the bar 122 to move up or down within the opening 123. In other embodiments, no threading may be present along the bar 122 and/or the opening 123. It will be appreciated that the bar 122 may be a shaft, arm, knob, pin, lever, or other similar component.

As shown, the locking device 116 may further include a stopper 128 coupled to a first end 129 of the bar 122. The stopper 128 may be located within the interior channel 104 of the strut 102, and may include a housing 130 and a magnetic material 131 within the housing 130. As shown, the housing 130 may be open along an upper side to permit the magnetic material 131 to contact the end wall 106 of the strut 102. In some embodiments, the housing 130 is insulative/non-magnetic. In other embodiments, no housing 130 is present, and the stopper 128 is a magnet directly coupled to the first end 129 of the bar 122.

As further shown, the locking device 116 may include a biasing device, or spring 132, positioned between the main body 118 and the stopper 128. More specifically, a first end of the spring 132 may be directly coupled to the main body 118, while a second end of the spring 132 may be directly coupled to an underside of the housing 130 of the stopper 128. In some embodiments, the spring 132 may surround the first element 125 of the bar 122. The spring 132 is operable to provide a force substantially along the y-direction to bias the stopper 128 and the main body 118 relative to one another.

Figure 1B:
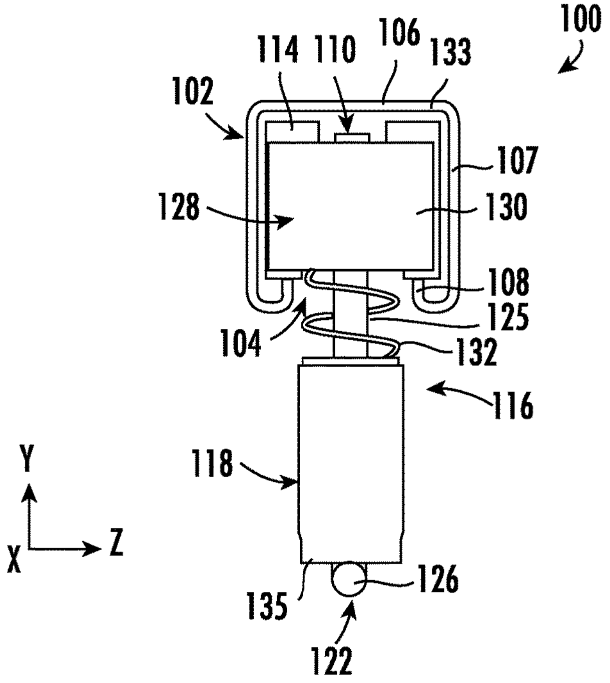
FIG. 1B is an end view of the assembly of FIG. 1A according to embodiments of the present disclosure.

FIGS. 1A-1B represent the assembly 100 when the locking device 116 is in an unlocked configuration. That is, the bar 122 may be rotated about the central axis, causing the second element 126 of the bar 122 to extend substantially parallel to a lengthwise axis (e.g., x-axis) of the strut 102. The second element 126 of the bar 122 may be positioned against an underside 135 of the main body 118, which causes the bar 122 and the stopper 128 to be pulled down in the y-direction. As a result, when the bar 122 and the stopper 128 are in a first position, a gap 134 is present between the upper side of the stopper 128 and an underside 133 of the end wall 106 of the strut 102. A lower surface of the stopper 128 may be positioned atop, or in close proximity to, the set of turned-in ends 108 of the strut 102. The trolley body 110 may then be free to move along the lengthwise axis of the strut 102.

Figure 2A:
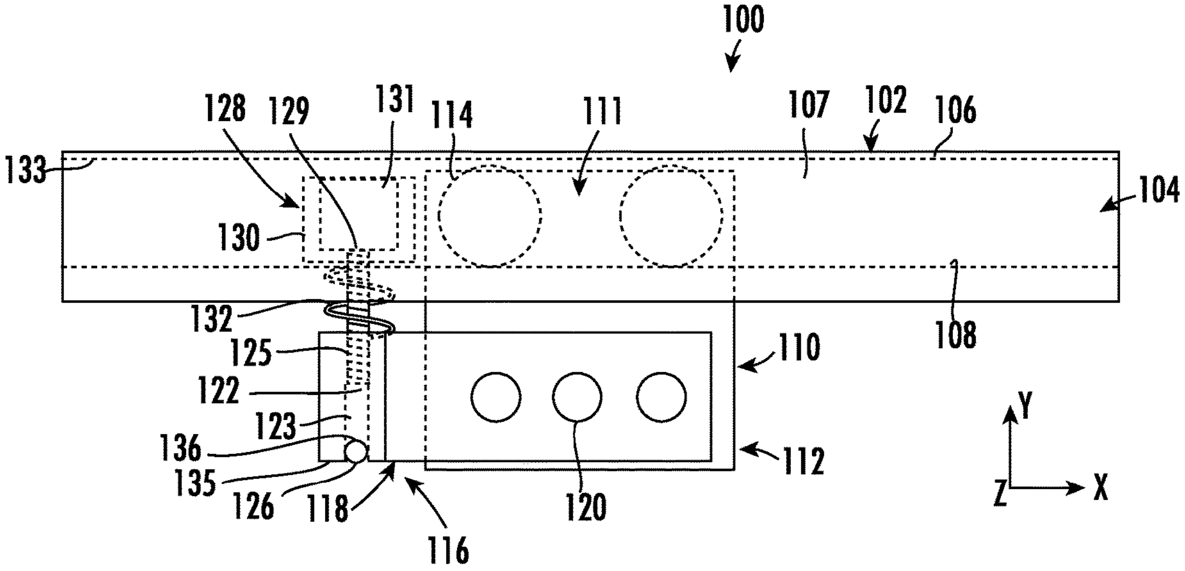
FIG. 2A is a side view of the assembly according to embodiments of the present disclosure.
Figure 2B:
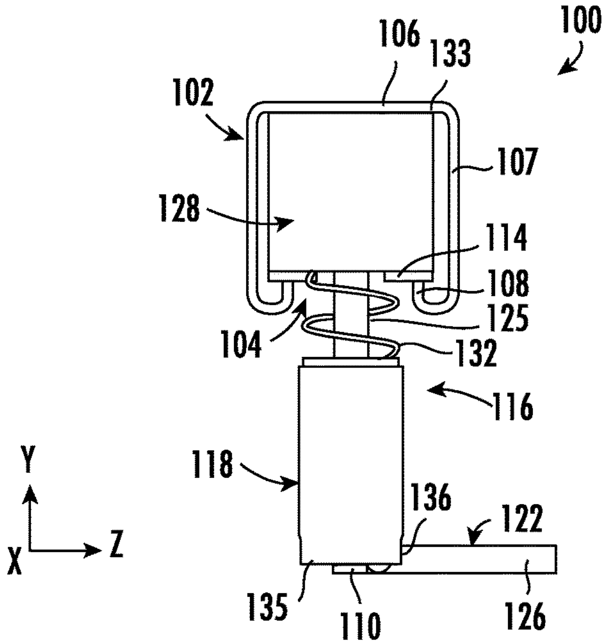
FIG. 2B is an end view of the assembly of FIG. 2A according to embodiments of the present disclosure.

FIGS. 2A-2B represent the assembly 100 when the locking device 116 is in a locked configuration. That is, the bar 122 may be rotated about the central axis, causing the second element 126 of the bar 122 to move along the underside 135 of the main body 118 until it extends substantially perpendicular to a lengthwise axis of the strut 102. As shown, the second element 126 of the bar 122 may be positioned partially within the opening 123 of the main body 118, which permits the bar 122 and the stopper 128 to be pushed up in the y-direction in response to a spring force from the spring 132. As a result, when the bar 122 and the stopper 128 are in a second position, the upper surface of the stopper 128 is in direct physical contact with the underside 133 of the end wall 106 of the strut 102 and held in place by magnetic attraction. The trolley body 110 may then be prevented from moving along the lengthwise axis of the strut 102. In some embodiments, the bar 122 may be positioned within a notch or recess 136 of the main body 118 when the bar 122 is in the locked position.

Figure 3A:
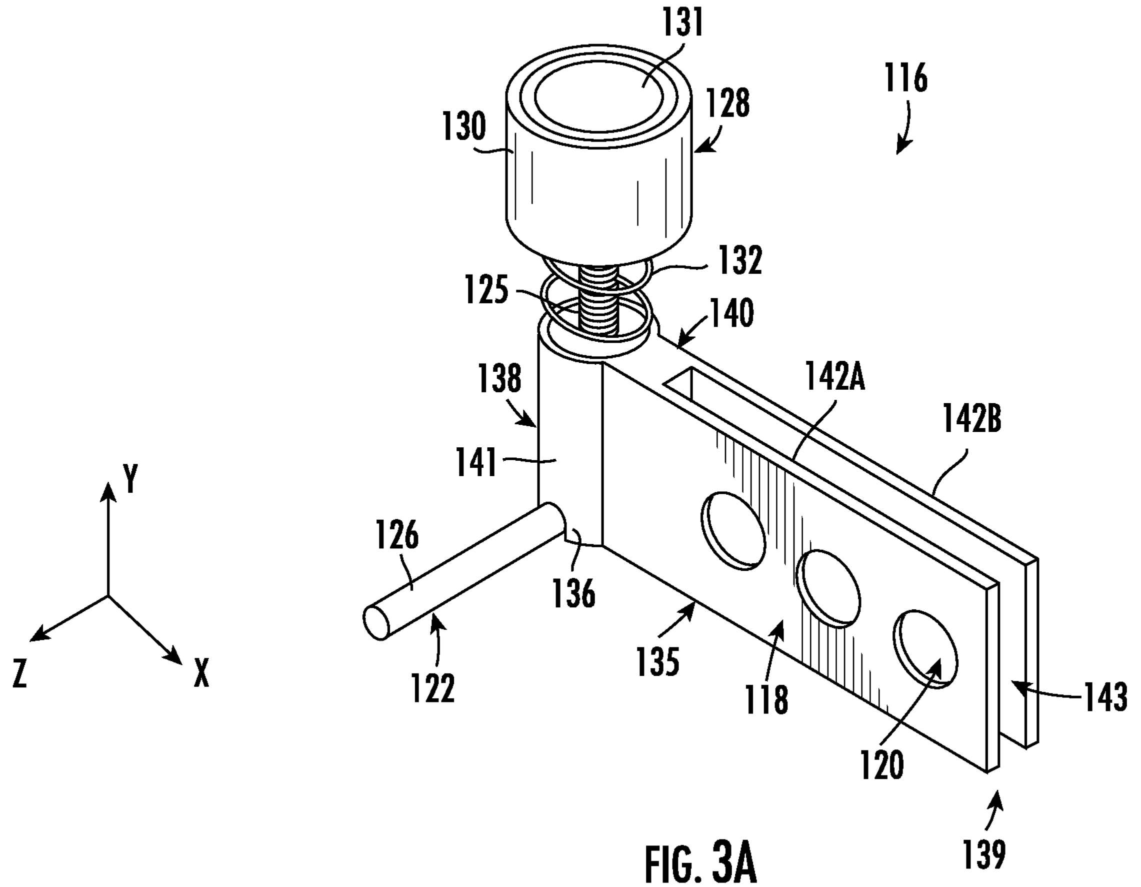
FIG. 3A is a perspective view of a locking device according to embodiments of the present disclosure.
Figure 3B:
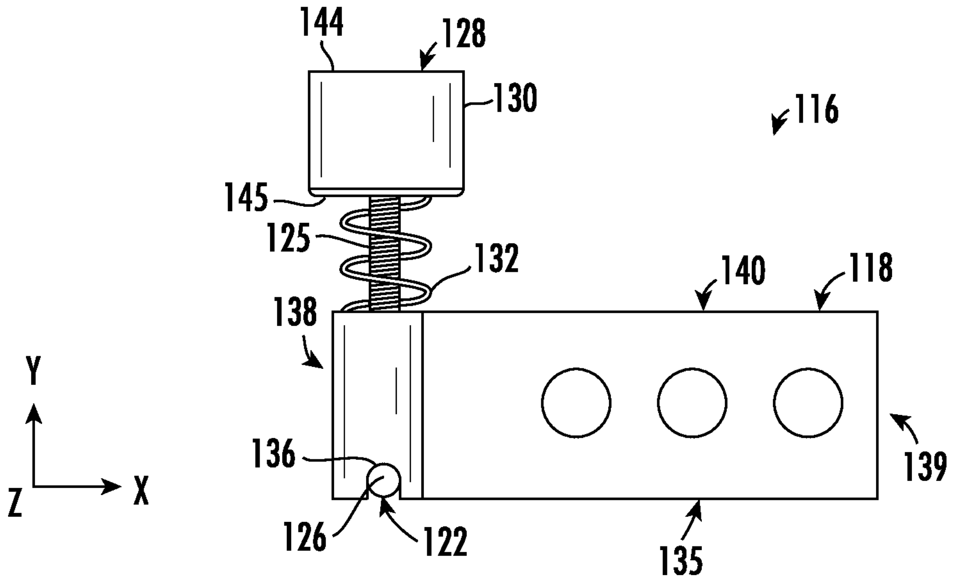
FIG. 3B is a side view of the locking device of FIG. 3A according to embodiments of the present disclosure.

Turning now to FIGS. 3A-3B, the locking device 116 will be described in greater detail. In this embodiment, the main body 118 may include a first end 138 opposite a second end 139, and an upper side 140 opposite the underside 135. At the first end 138 may be a cylindrical portion 141 extending around the first element 125 of the bar 122. The spring 132 may be directly coupled to an upper surface of the cylindrical portion 141. As further shown, the recess 136 may be formed along the underside 135 of the cylindrical portion 141. Although the bar 122 is shown generally as cylindrical, it will be appreciated that the profile/cross-section of the bar 122 may vary in other embodiments.

As further shown, the main body 118 may include a first plate or panel 142A extending parallel to a second plate or panel 142B. The first and second panels 142A, 142B may be separated by a gap 143 to receive the second portion 112 of the trolley body 110 therein. Once the first and second panels 142, 142B are placed around the trolley body 110, bolts or other similar fasteners may be placed through openings 120 of the main body 118 to secure the main body 118 to the trolley body 110. In an alternative embodiment, the trolley body 110 may include multiple panels, while the main body 118 includes a single plate. It will be appreciated that a variety of alternative configurations for the main body 118 are possible.

As further demonstrated, the stopper 128 may extend vertically above the main body 118, and the housing 130 may extend circumferentially around the magnetic material 131. The stopper 128 may include an upper surface 144 operable to contact the underside 133 of the strut 102, and a lower surface 145 in direct contact with the spring 132. In this non-limiting embodiment, the spring 132 may be a helical compression spring. Although shown as generally cylindrical, the stopper 128 may take on a different shape or configuration in alternative embodiments.

Figure 4A:
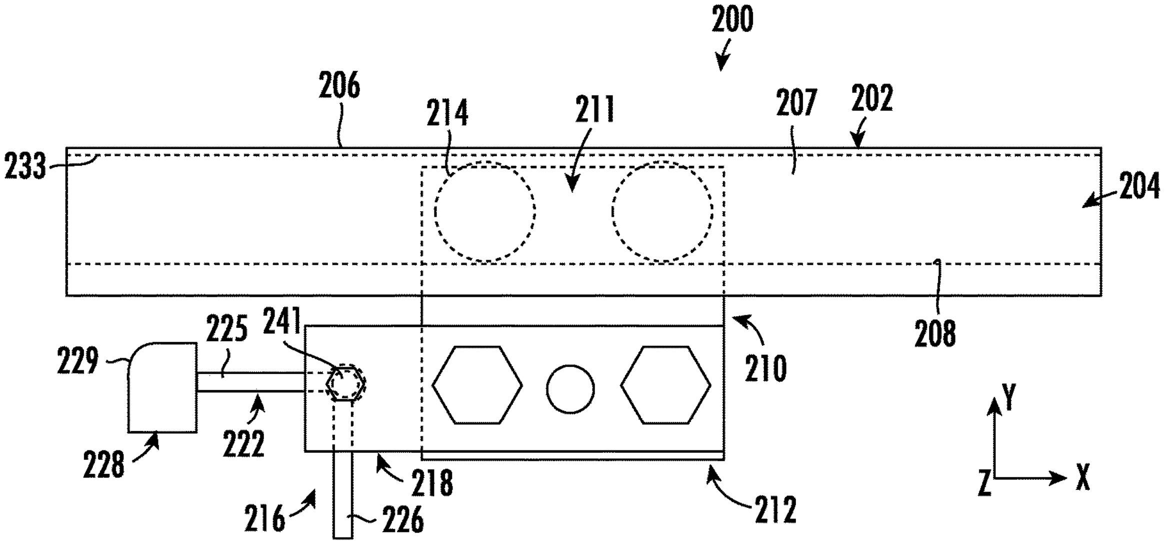
FIG. 4A is a side view of an assembly according to embodiments of the present disclosure.
Figure 4B:
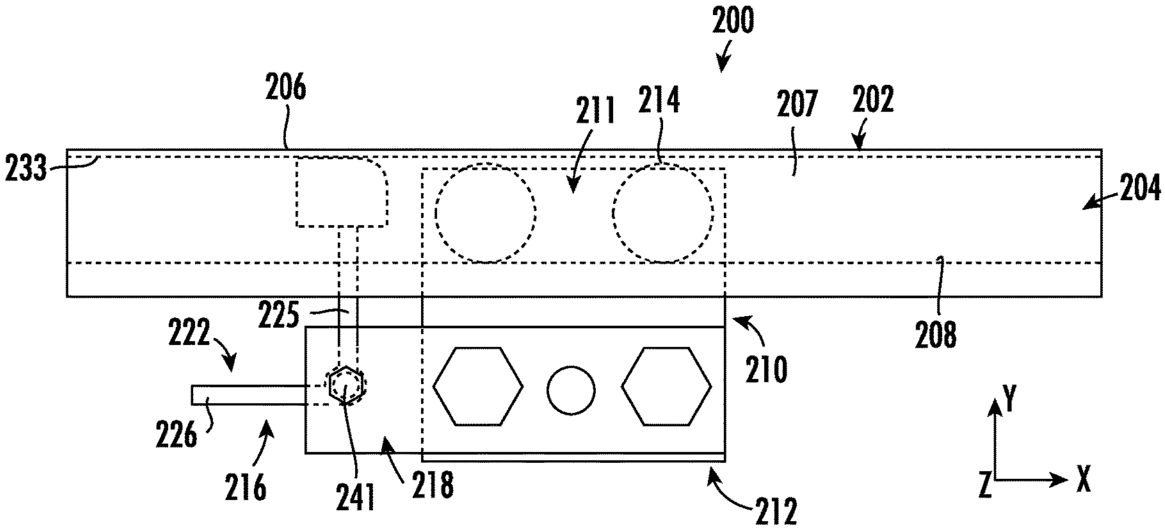
FIG. 4B is an end view of the assembly of FIG. 4A according to embodiments of the present disclosure.
Figure 5A:
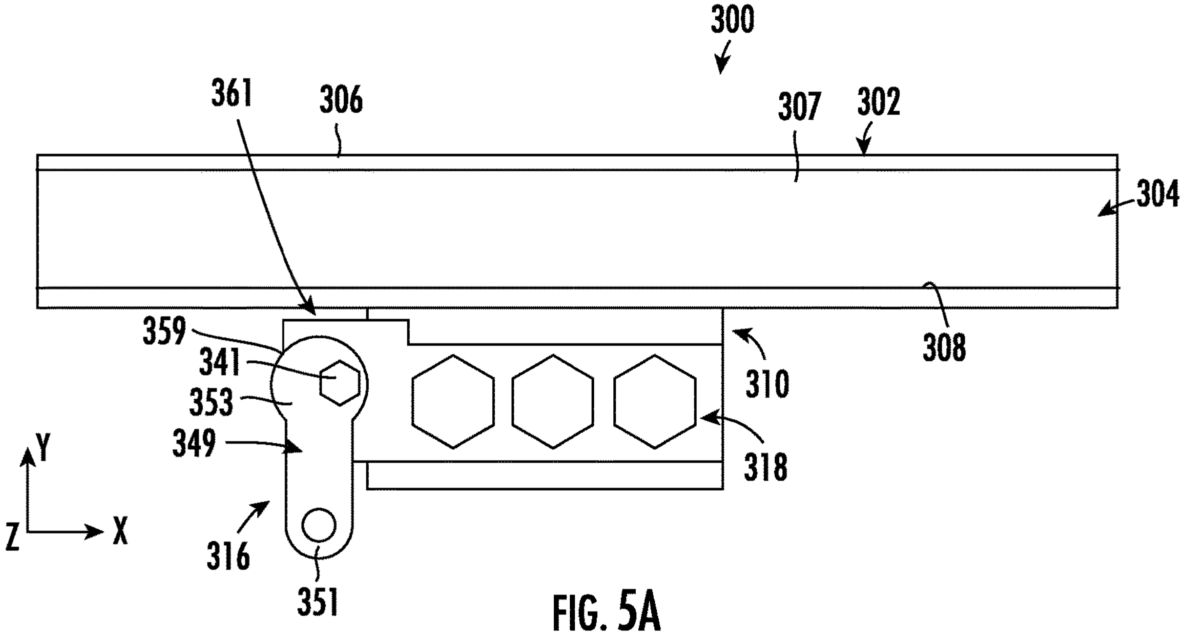
FIG. 5A is a side view of an assembly according to embodiments of the present disclosure.
Figure 5B:
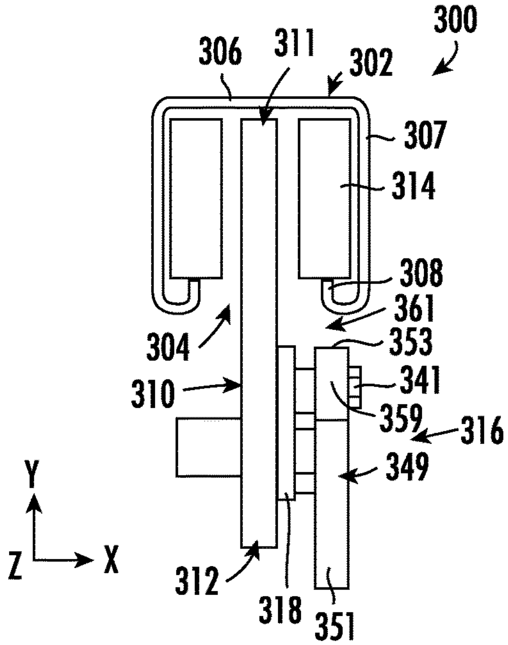
FIG. 5B is an end view of the assembly of FIG. 5A according to embodiments of the present disclosure.
Figure 6A:
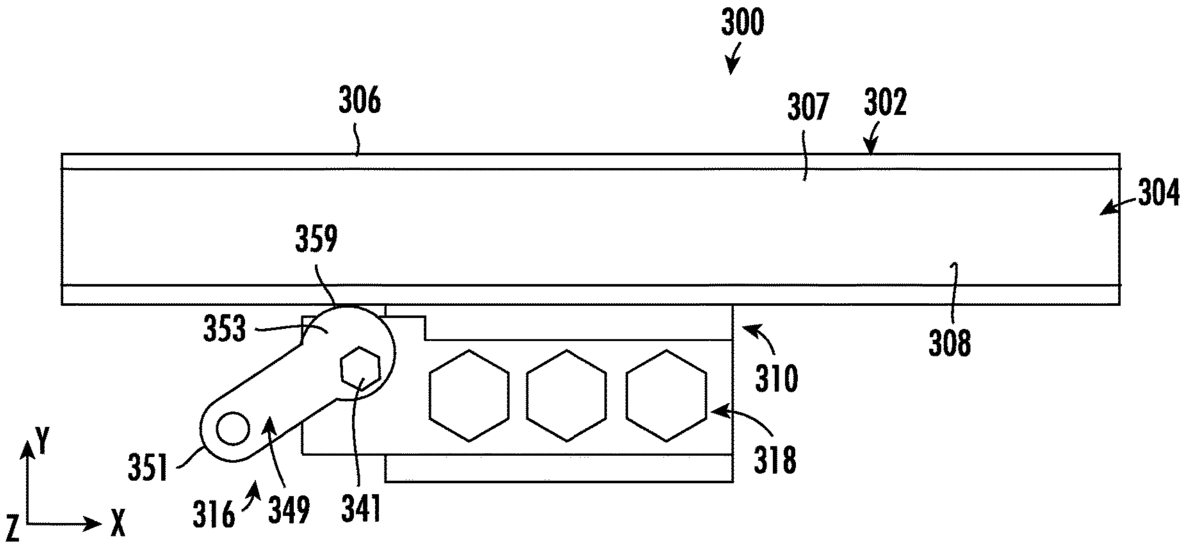
FIG. 6A is a side view of the assembly according to embodiments of the present disclosure.
Figure 6B:
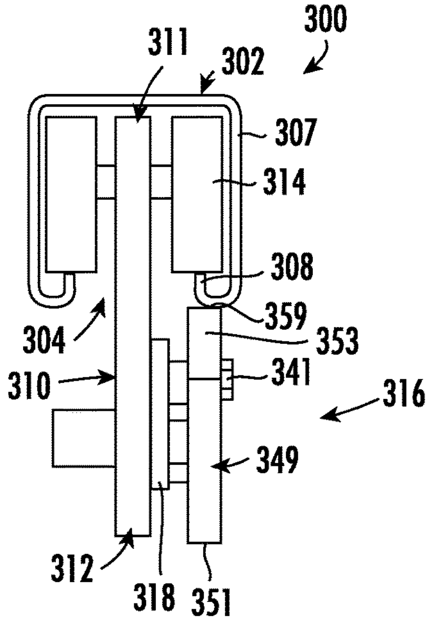
FIG. 6B is an end view of the assembly of FIG. 6A according to embodiments of the present disclosure.
Figure 7A:
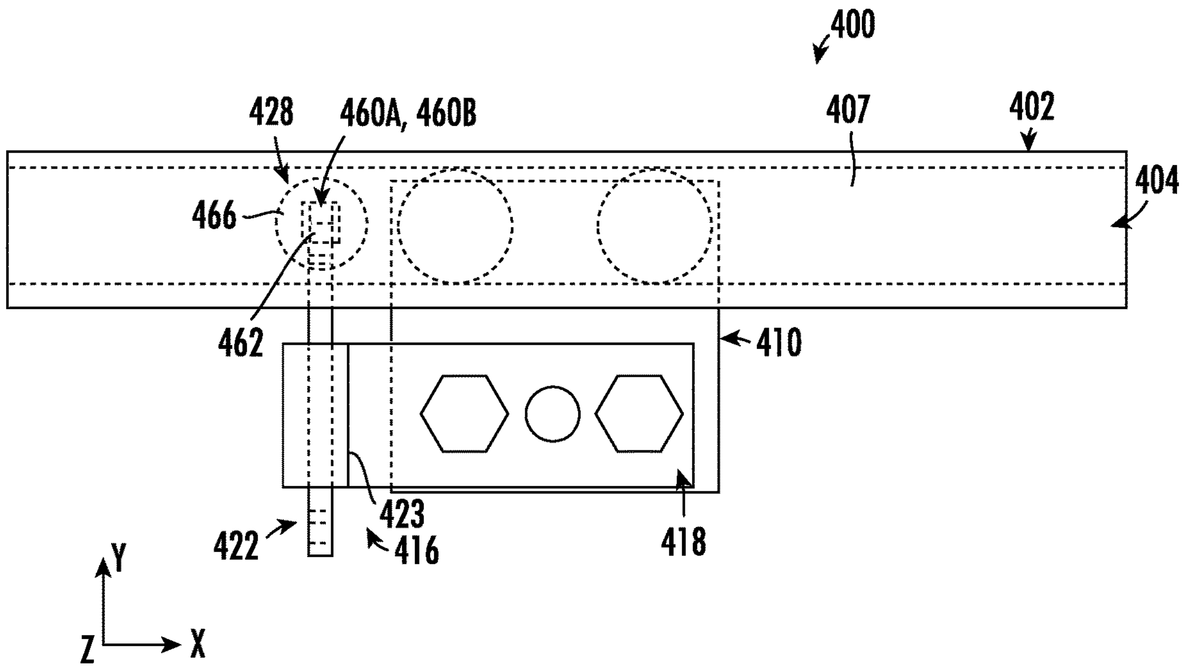
FIG. 7A is a side view of an assembly according to embodiments of the present disclosure.
Figure 7B:
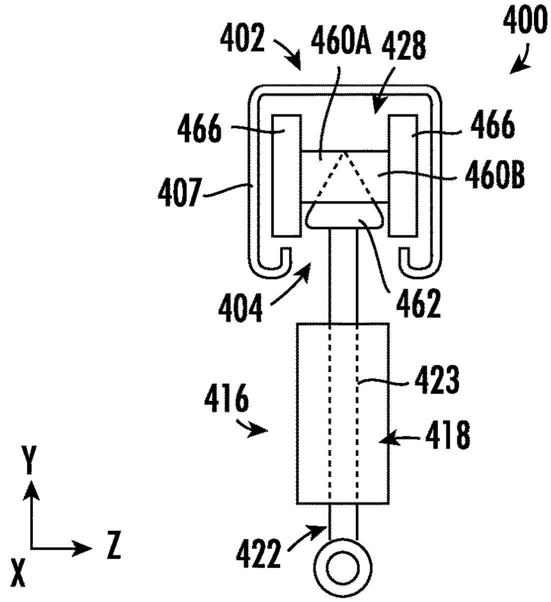
FIG. 7B is an end view of the assembly of FIG. 7A according to embodiments of the present disclosure.
Figure 8A:
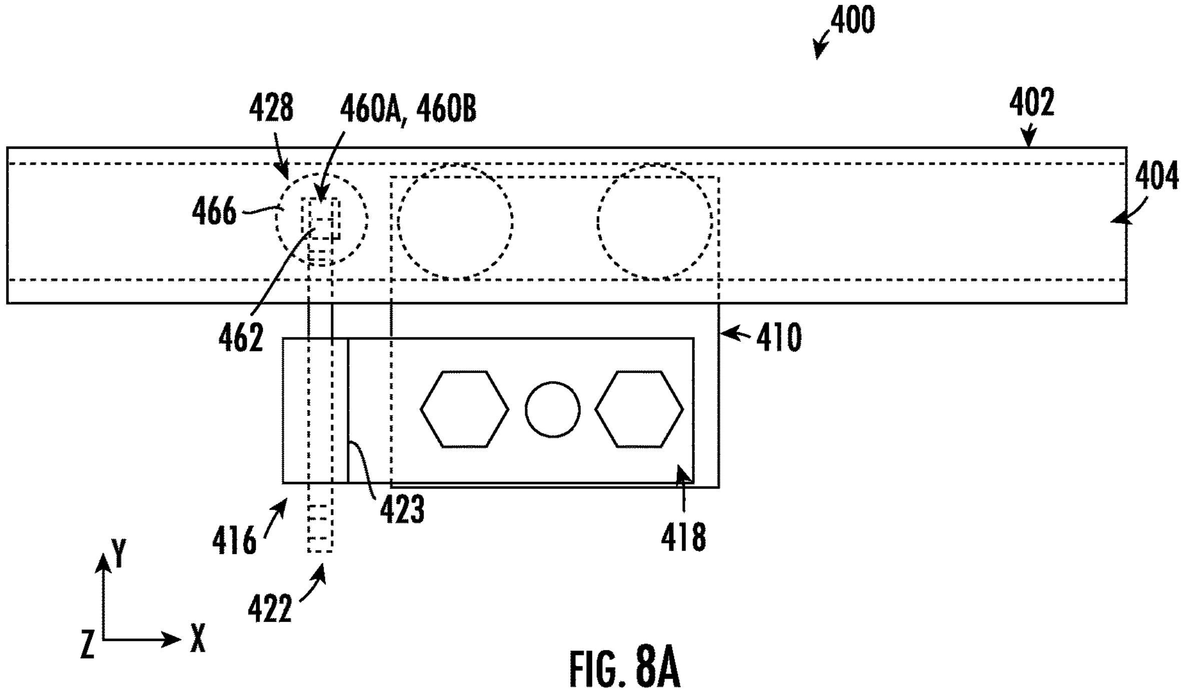
FIG. 8A is a side view of the assembly according to embodiments of the present disclosure.
Figure 8B:
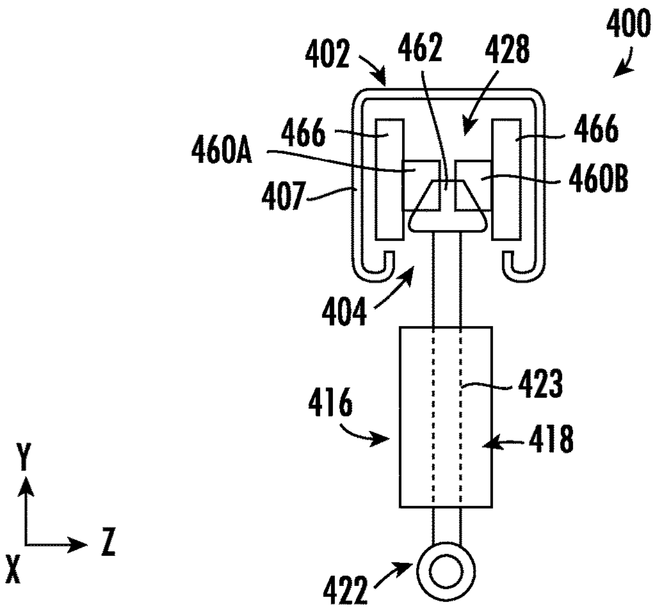
FIG. 8B is an end view of the assembly of FIG. 8A according to embodiments of the present disclosure.

Referring now to FIGS. 4A-4B, another exemplary assembly 200 according to embodiments of the present disclosure will be described in greater detail. The assembly 200 may be the same or similar in many aspects to the assembly 100 described above. As such, only certain features of the assembly 200 will hereinafter be described for the sake brevity. As shown, the assembly 200 may include a channel member or strut 202, which may be secured to or suspended from a ceiling or wall. The strut 202 may be a generally U-shaped strut or brace member including an interior channel 204, an end wall 206, a set of sidewalls 207, and a set of turned-in ends 208 extending from the sidewalls 207.

The assembly 200 may further include a trolley body 210 coupled to the strut 202. As shown, the trolley body 210 may include a first portion 211 positioned within the interior channel 204 of the strut 202, and a second portion 212 extending outside the strut 202. Rollers 214 permit movement of the trolley body 210 relative to the strut 202.

The assembly 200 may further include a locking device 216 coupled to the trolley body 210, wherein the locking device 216 may include a main body 218 coupled to the second portion 212 of the trolley body 210. The locking device 216 may further include a bar 222 coupled to the main body 218. As shown, the bar 222 may be rotatably coupled to the main body 218 by a bolt 241 or other similar fastener. In some embodiments, the bar 222 may be an L-shaped bolt having a first section or element 225 and a second section or element 226 oriented substantially perpendicular to one another. It will be appreciated that the angle between the first element 225 and the second element 226 may vary in alternative embodiments.

As shown, the locking device 216 may further include a stopper 228 coupled to the first element 225 of the bar 222. The stopper 228 may include an angled or curved surface 229 operable to engage an underside 233 of end wall 206 of the strut 202. In some embodiments, the stopper 228 may include a central magnet covered by a polymer (e.g., rubber), the polymer adding to the friction between the stopper 228 and the end wall 206 of the strut 202. In other embodiments, no covering is present, and the stopper 228 includes only a magnet coupled to the bar 222. In still other embodiments, no magnet is present within the stopper 228, and only a polymer element is used.

In an unlocked configuration, shown in FIG. 4A, the first element 225 is generally parallel with a lengthwise axis of the strut 202, and the stopper 228 is positioned outside of the strut 202. In a locked configuration, shown in FIG. 4B, the bar 222 is rotated about the bolt 241 until the first element 225 is generally perpendicular with the lengthwise axis of the strut 202 and the stopper 228 is engaged with the underside 233 of end wall 206 of the strut 202. The stopper 228 is sized to be able to swing between the set of turned-in ends 208 of the strut 202. When locked, the trolley body 210 is prevented from moving along the strut 202.

Referring now to FIGS. 5A-6B, another exemplary assembly 300 according to embodiments of the present disclosure will be described in greater detail. The assembly 300 may be the same or similar in many aspects to the assemblies 100, 200 described above. As such, only certain features of the assembly 300 will hereinafter be described for the sake brevity. As shown, the assembly 300 may include a channel member or strut 302 including an interior channel 304, an end wall 306, a set of sidewalls 307, and a set of turned-in ends 308 extending from the sidewalls 307.

The assembly 300 may further include a trolley body 310 coupled to the strut 302. As shown, the trolley body 310 may include a first portion 311 positioned within the interior channel 304 of the strut 302, and a second portion 312 extending outside the strut 302. Rollers 314 permit movement of the trolley body 310 relative to the strut 302 (e.g., along the x-direction).

The assembly 300 may further include a locking device 316 coupled to the trolley body 310, wherein the locking device 316 may include a main body 318 coupled to the second portion 312 of the trolley body 310. In this embodiment, the locking device 316 includes a cam 322 rotatably coupled to the main body 318 by a bolt 341 or other similar fastener. In some embodiments, the cam 322 includes a cam arm 349 having a free end 351 opposite a fixed end 353. The fixed end 353 of the cam body may include an engagement surface 359 operable to press against the strut 302 to prevent relative motion between the trolley body 310 and the strut 302. More specifically, in an unlocked configuration, shown in FIGS. 5A-5B, the cam arm 322 is generally oriented perpendicular to the strut 302 and a gap 361 is present between the engagement surface 359 and the strut 302. In a locked configuration, shown in FIGS. 6A-6B, the cam arm 349 is rotated about the bolt 341 until the engagement surface 359 makes physical contact with the turned-in ends 308 of the strut 302. The engagement surface 359 creates friction against the surface of the turned-in ends 308 to prevent the trolley body 310 from moving along the strut 302. In some embodiments, the fixed end 353 of the cam arm 349, or all of the cam arm 349, may include a magnetic material to further enhance the connection between the engagement surface 359 and the strut 302. In other embodiments, the fixed end 353 of the cam arm 349 may additionally or alternatively include a polymer engagement surface 359.

Referring now to FIGS. 7A-8B, another exemplary assembly 400 according to embodiments of the present disclosure will be described in greater detail. The assembly 400 may be the same or similar in many aspects to the assemblies 100, 200, and 300 described above. As such, only certain features of the assembly 400 will hereinafter be described for the sake brevity. The assembly 400 may include a trolley body 410 coupled to a strut 402. The assembly 400 may further include a locking device 416 coupled to the trolley body 410, wherein the locking device 416 may include a main body 418 coupled to the trolley body 410.

In this embodiment, the locking device 416 may include a bar 422 extending through the main body 418. As shown, the bar 422 may be positioned within a bar channel or opening 423, which extends vertically through the main body 418. The locking device 416 may further include a stopper 428 positioned within an interior channel 404 of the strut 402, wherein the stopper 428 may include a pair of magnets 460A, 460B each coupled to a polymer (e.g., rubber) braking disc 466. One end of the bar 422 may be coupled to a splitter or wedge 462, which may be forced between the pair of magnets 460A, 460B to move the braking discs 466 towards a set of sidewalls 407 of the strut 402. More specifically, in an unlocked configuration, shown in FIGS. 7A-7B, the bar 422 is in a lowered position, and a gap is present between each of the braking discs 466 and an inner surface of the set of sidewalls 407. In a locked configuration, shown in FIGS. 8A-8B, the bar 422 is in an elevated position, and the braking discs 466 are engaged with the inner surface of the set of sidewalls 407. As shown, the wedge 462 forces the pair of magnets 460A, 460B apart from one another. The pair of magnets 460A, 460B, together with the braking discs 466, secure the braking discs 466 to create friction against the strut 402 and prevent the trolley body 410 from moving.

Figure 9:
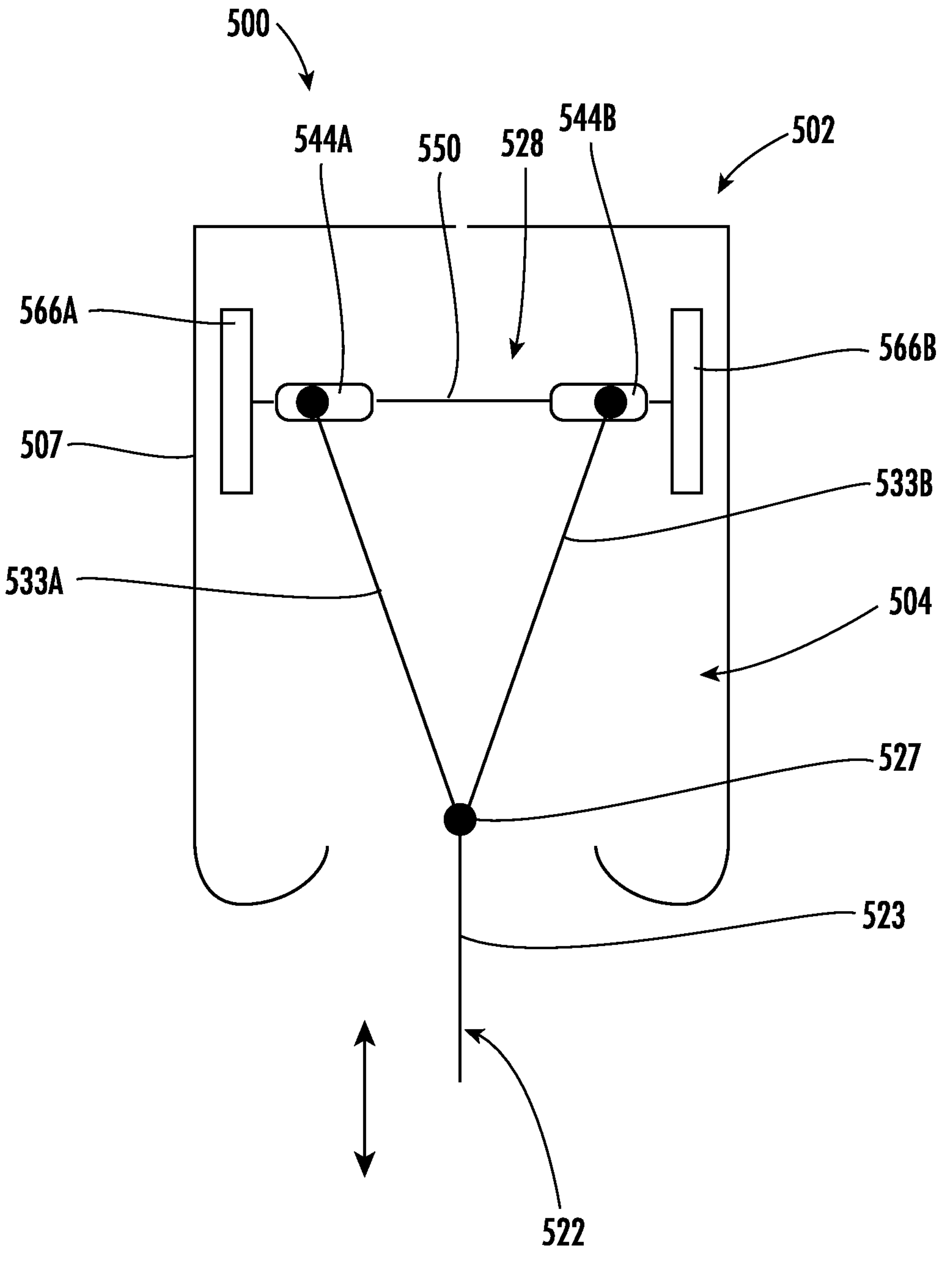
FIG. 9 is an end view of an assembly according to embodiments of the present disclosure.

Referring now to FIG. 9, another exemplary assembly 500 according to embodiments of the present disclosure will be described in greater detail. The assembly 500 may be the same or similar in many aspects to the assemblies 100, 200, 300, and 400 described above. As such, only certain features of the assembly 500 will hereinafter be described for the sake brevity. In this embodiment, a locking device 516 may include a biasing member 522 connected to a stopper 528, which is positioned within an interior channel 504 of a strut 502. The biasing member 522 may include a first component 523 extending outside of the strut 502, and a pair of arms 533A, 533B extending at an angle away a central joint 527, which couples together the first component 523 and the pair of arms 533A, 533B. In some embodiments, the pair of arms 533A, 533B may be substantially rigid.

The stopper 528 may include a pair of sliders 544A, 544B coupled to a support member 550. Arm 533A may be directly coupled to slider 544A, while arm 533B may be directly coupled to slider 544B. The stopper 528 may further include a pair of braking discs 566A, 566B coupled to respective sliders 544A, 544B. In various embodiments, the braking discs 566A, 566B may include magnetic and/or polymeric materials. During use, the biasing member 522 may cause the braking discs 566A, 566B to move relative to a set of sidewalls 507 of the strut 502. More specifically, to enter an unlocked configuration, the biasing member 522 and is pulled down, causing the pair of sliders 544A, 544B and therefore the braking discs 566A, 566B, to move towards one another. As the braking discs 566A, 566B move away from the sidewalls 507 of the strut 502, a gap is created, which allows the trolley body (not shown) to move relative to the strut 502. To transition to a locked configuration, the biasing member 522 is moved upwards, causing the pair of sliders 544A, 544B and therefore the braking discs 566A, 566B, to move against the inner surface of the sidewalls 507 of the strut 502. The braking discs 566A, 566B create friction against the strut 502 to prevent the trolley body from moving within the strut 502.

Figure 10:
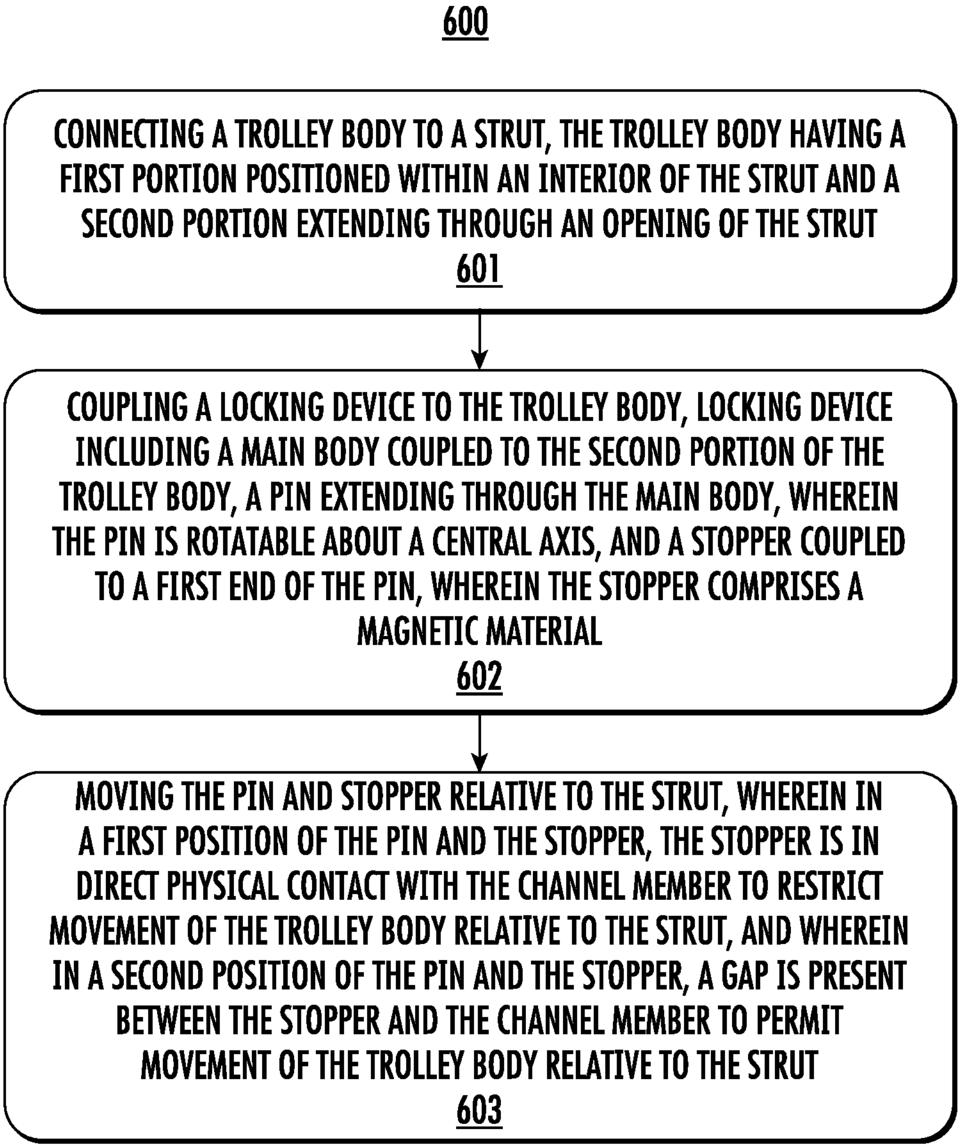
FIG. 10 is a method according to embodiments of the present disclosure.

Turning now to FIG. 10, a method 600 according to embodiments of the disclosure will be described with reference to assembly 100. At block 601, the method 600 may include connecting a trolley body to a strut, the trolley body having a first portion positioned within an interior of the strut and a second portion extending through an opening of the strut. In some embodiments, the trolley body may include a plurality of rollers to permit movement of the trolley body relative to the strut. The plurality of rollers may be positioned atop a set of turned-in ends of the sidewalls of the strut.

At block 602, the method 600 may further include coupling a locking device to the trolley body, the locking device including a main body coupled to the second portion of the trolley body, a bar extending through the main body, wherein the bar is rotatable about a central axis, and a stopper coupled to a first end of the bar, wherein the stopper comprises a magnetic material.

At block 603, the method 600 may further include moving the bar and stopper relative to the strut, wherein in a first position of the bar and the stopper, the stopper is in direct physical contact with the channel member to restrict movement of the trolley body relative to the strut, and wherein in a second position of the bar and the stopper, a gap is present between the stopper and the channel member to permit movement of the trolley body relative to the strut. In some embodiments, moving the bar and the stopper relative to the strut may include rotating the bar about the central axis, wherein in the first position of the bar and the stopper, a spring of the locking devices biases the stopper against an inner surface of an end wall of the strut, and wherein rotation of the bar to the second position compresses the spring of the locking device to remove the stopper from the inner surface of the end wall of the strut. In some embodiments, the bar may be secured within a recess of the main body when the bar and the stopper are in the locked position.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An assembly, comprising:

a channel member; and a trolley body having a first portion positioned within an interior of the channel member and a second portion extending from the channel member;

a locking device coupled to the trolley body, the locking device comprising:

a main body coupled to the second portion of the trolley body;

a bar extending through the main body, wherein the bar is rotatable about a central axis; and a stopper coupled to a first end of the bar, wherein the stopper comprises a magnetic material, wherein in a first position of the bar and the stopper, the stopper is in direct physical contact with the channel member, and wherein in a second position of the bar and the stopper, a gap is present between the stopper and the channel member.

2. The assembly of claim 1, wherein the bar is an L-shaped bolt having a first element extending along the central axis and a second element extending perpendicular to the first element.

3. The assembly of claim 2, wherein the second element of the L-shaped bolt is in direct physical contact with an underside of the main body.

4. The assembly of claim 2, wherein the second element of the L-shaped bolt is retained within a recess of the main body when the stopper is in direct physical contact with the channel member.

5. The assembly of claim 1, wherein the channel member comprises:

an end wall; and a set of sidewalls connected to the end wall, wherein each sidewall of the set of sidewalls comprises a turned-in end, wherein the end wall and the set of sidewalls define an interior channel, and wherein the first portion of the trolley body is positioned within the interior channel.

6. The assembly of claim 5, further comprising a plurality of rollers coupled to the trolley body, and wherein the plurality of rollers are in contact with the turned-in ends of the set of sidewalls.

7. The assembly of claim 5, wherein in the first position of the bar and the stopper, the stopper is in direct physical contact with an inner surface of the end wall of the channel member, and wherein in the second position of the bar and the stopper, the gap is present between the stopper and the inner surface of the end wall of the channel member.

8. The assembly of claim 1, wherein the locking device further comprises a spring extending around the bar, wherein the spring is positioned between the main body and the stopper.

9. The assembly of claim 8, wherein in the first position of the bar and the stopper, the spring biases the stopper against the channel member.

10. An assembly, comprising:

a trolley body having a first portion positioned within an interior of a strut and a second portion extending through an opening of the strut;

a locking device coupled to the trolley body, the locking device comprising:

a main body coupled to the second portion of the trolley body;

a bar extending through the main body, wherein the bar is rotatable about a central axis; and a stopper coupled to a first end of the bar, wherein the stopper comprises a magnetic material, wherein in a first position of the bar and the stopper, the stopper is in direct physical contact with the strut, and wherein in a second position of the bar and the stopper, a gap is present between the stopper and the strut.

11. The assembly of claim 10, wherein the bar is an L-shaped bolt having a first element extending along the central axis and a second element extending perpendicular to the first element, and wherein the second element of the L-shaped bolt is in direct physical contact with an underside of the main body.

12. The assembly of claim 11, wherein the second element of the L-shaped bolt is retained within a recess of the main body when the stopper is in direct physical contact with the strut.

13. The assembly of claim 10, wherein the strut comprises:

an end wall; and a set of sidewalls connected to the end wall, wherein each sidewall of the set of sidewalls comprises a turned-in end, wherein the end wall and the set of sidewalls define an interior channel, and wherein the first portion of the trolley body is positioned within the interior channel.

14. The assembly of claim 13, wherein the trolley body further comprises a plurality of rollers, and wherein the plurality of rollers are in contact with the turned-in ends of the set of sidewalls.

15. The assembly of claim 13, wherein in the first position of the bar and the stopper, the stopper is in direct physical contact with an inner surface of the end wall of the strut, and wherein in the second position of the bar and the stopper, the gap is present between the stopper and the inner surface of the end wall of the strut.

16. The assembly of claim 10, wherein the locking device further comprises a spring extending around the bar, wherein the spring is positioned between the main body and the stopper, and wherein in the first position of the bar and the stopper, the spring biases the stopper against strut.

17. A method, comprising:

connecting a trolley body to a strut, the trolley body having a first portion positioned within an interior of the strut and a second portion extending through an opening of the strut;

coupling a locking device to the trolley body, the locking device comprising:

a main body coupled to the second portion of the trolley body;

a bar extending through the main body, wherein the bar is rotatable about a central axis; and a stopper coupled to a first end of the bar, wherein the stopper comprises a magnetic material;

moving the bar and stopper relative to the strut, wherein in a first position of the bar and the stopper, the stopper is in direct physical contact with the strut to restrict movement of the trolley body relative to the strut, and wherein in a second position of the bar and the stopper, a gap is present between the stopper and the strut to permit movement of the trolley body relative to the strut.

18. The method of claim 17, wherein moving the bar and the stopper relative to the strut comprises rotating the bar about the central axis, wherein in the first position of the bar and the stopper, a spring of the locking devices biases the stopper against an inner surface of an end wall of the strut, and wherein rotation of the bar to the second position compresses the spring of the locking device to remove the stopper from the inner surface of the end wall of the strut.

19. The method of claim 17, further comprising securing the bar within a recess of the main body when the bar and the stopper are in the first position.

20. The method of claim 17, wherein connecting the trolley body to the strut comprises positioning a plurality of rollers of the trolley body atop a pair of turned-in ends of the strut.

* * * * *